(12) United States Patent
Schiffer et al.

(10) Patent No.: US 8,051,627 B2
(45) Date of Patent: Nov. 8, 2011

(54) TOWER ADAPTER, METHOD OF PRODUCING A TOWER FOUNDATION AND TOWER FOUNDATION

(75) Inventors: Joris Schiffer, Hannover (DE); Kenneth B. Leland, Greer, SC (US)

(73) Assignee: General Electric Company, Schenectady, NY (US)

( * ) Notice: Subject to any disclaimer, the term of this patent is extended or adjusted under 35 U.S.C. 154(b) by 1035 days.

(21) Appl. No.: 11/380,937

(22) Filed: Apr. 30, 2006

(65) Prior Publication Data

US 2007/0251187 A1 Nov. 1, 2007

(51) Int. Cl.
*E04C 3/00* (2006.01)

(52) U.S. Cl. .......... 52/854; 52/849; 52/301; 52/296

(58) Field of Classification Search .......... 52/295, 52/296, 297, 301, 223.3, 223.4, 223.5, 223.12, 52/223.13, 223.14, 253, 649.3, 649.6, 704, 52/705, 706, 848, 849, 845, 854; 248/156, 248/519, 405, 188.1, 188.2, 188.4, 127; 405/229, 405/231, 244, 249, 251
See application file for complete search history.

(56) References Cited

U.S. PATENT DOCUMENTS

| | | | | |
|---|---|---|---|---|
| 890,373 A * | 6/1908 | Orr | ................ | 52/296 |
| 1,647,925 A * | 11/1927 | May | ................ | 52/223.5 |
| 3,552,073 A * | 1/1971 | Millerbernd | ................ | 52/98 |
| 3,572,223 A * | 3/1971 | Vierregger | ................ | 52/296 |
| 3,713,259 A * | 1/1973 | Tkach | ................ | 52/111 |
| 3,942,296 A * | 3/1976 | Meyer | ................ | 52/296 |
| 3,987,637 A | 10/1976 | Koehler | | |
| 4,079,559 A | 3/1978 | Tenbrummeler | | |
| 4,295,308 A * | 10/1981 | Korfanta | ................ | 52/296 |
| 4,406,094 A | 9/1983 | Hempel et al. | | |
| 4,561,231 A | 12/1985 | Hoyt et al. | | |
| 4,591,466 A * | 5/1986 | Murray et al. | ................ | 405/230 |
| 4,707,964 A | 11/1987 | Hoyt et al. | | |
| 5,499,885 A * | 3/1996 | Chapman | ................ | 403/380 |
| 5,505,033 A * | 4/1996 | Matsuo et al. | ................ | 52/296 |
| 5,660,013 A * | 8/1997 | Saldarelli et al. | ................ | 52/296 |
| 5,660,504 A | 8/1997 | Reinert, Sr. | | |
| 5,733,068 A | 3/1998 | Reinert, Sr. | | |
| 5,775,848 A | 7/1998 | Blankinship et al. | | |

(Continued)

FOREIGN PATENT DOCUMENTS

FR 1 406 299 A 7/1965

(Continued)

OTHER PUBLICATIONS

Chinese Patent Office, First Office Action including Text of First Office Action of Patent Application No. 200710102379.7, Jan. 8, 2010, 8 pages.

(Continued)

*Primary Examiner* — Jessica Laux
(74) *Attorney, Agent, or Firm* — James McGinness, Esq.; Armstrong Teasdale LLP

(57) ABSTRACT

A tower adapter is provided, the tower adapter includes a cylindrical portion extending in a longitudinal direction of the adapter, and a first lateral portion extending perpendicularly to the cylindrical portion at a first end thereof and having a plurality of first through-holes. The ratio of a maximum longitudinal extension and a maximum lateral extension of the adapter is smaller than or equal to 1.

8 Claims, 12 Drawing Sheets

U.S. PATENT DOCUMENTS

| | | | |
|---|---|---|---|
| 5,826,387 A * | 10/1998 | Henderson et al. | 52/295 |
| 6,343,445 B1 | 2/2002 | Ryan | |
| 6,808,350 B1 | 10/2004 | Tooman et al. | |
| 6,872,883 B2 * | 3/2005 | Ginsburg | 174/45 R |
| 7,155,867 B2 * | 1/2007 | Saldarelli et al. | 52/292 |
| 7,762,041 B1 * | 7/2010 | Wawrzeniak | 52/848 |
| 2004/0098935 A1 * | 5/2004 | Henderson | 52/296 |
| 2006/0048471 A1 | 3/2006 | Lee | |
| 2006/0236648 A1 * | 10/2006 | Grundman et al. | 52/726.4 |
| 2007/0187564 A1 * | 8/2007 | McGuire | 248/346.5 |
| 2007/0235616 A1 * | 10/2007 | Gross et al. | 248/346.5 |

FOREIGN PATENT DOCUMENTS

FR  1406299  7/1965

OTHER PUBLICATIONS

European Search Report, European Patent Office, Reference 199372/12342, App. No. 07107188.0-2303, Date of Completion of Search Aug. 22, 2007, 4 pgs.

European Search Report, dated Nov. 20, 2007. EP Application 07 10 7188.0-2303.

\* cited by examiner

TOWER ADAPTER, METHOD OF PRODUCING A TOWER FOUNDATION AND TOWER FOUNDATION

BACKGROUND OF THE INVENTION

This invention relates generally to a tower adapter, a method of producing a tower foundation and a tower foundation. In particular but not limited thereto, the present invention relates to a tower adapter for a wind turbine tower, a method for producing a foundation of a wind turbine tower, and a foundation of a wind turbine tower.

Several technical installations require a tower or a mast to which the installation is mounted. Non-limiting examples of such installations are wind turbines, antenna towers used in broadcasting or mobile telecommunication, pylons used in bridge work, or power poles. Typically, the tower is made of steel and must be connected to a foundation made of reinforced concrete. In these cases, the typical technical solution is to provide a flange with through-holes at the bottom of the tower. Anchor bolts are inserted into the through-holes and are fastened with nuts. Typically, the anchor bolts are connected to an anchor ring embedded in the foundation. Normally, the concrete surface of the foundation is relatively rough so that a grout joint is formed on which the flange is placed.

However, the bottom part of the tower has to be placed on the grout joint before the grout has finally cured. Therefore, a certain curing time of the grout joint has to be awaited after installing the bottom section of the tower until further sections of the tower can be installed. Typically, the curing of the grout takes at least 24 hours but may take even longer according to the conditions at the construction site. During this curing time of the grout joint, no further work can be done on the particular tower construction site. For example, the bottom section of a wind turbine tower is relatively large, typically about 10 m to 20 m long, and accordingly also relatively heavy. Therefore, the bottom section has to be transported in a horizontal position, e.g. to comply with the maximum headroom of bridges. Furthermore, two mobile cranes have to be used for lifting such a bottom section in a vertical position and placing it on the grout joint. However, after placing the bottom section on the grout joint the two mobile cranes are of no particular use until the grout joint has finally cured and further tower sections can be installed. Since mobile cranes are very expensive, it is economically detrimental if they are idle for longer times. Since the construction sites of wind turbines are often remote, it is also often economically detrimental to relocate the mobile cranes for the curing time of the grout joint.

BRIEF DESCRIPTION OF THE INVENTION

In view of the above, a tower adapter is provided. The tower adapter includes a cylindrical portion extending in a longitudinal direction of the adapter, and a first lateral portion extending perpendicularly to the cylindrical portion at a first end thereof and having a plurality of first through-holes, wherein the ratio of a maximum longitudinal extension and a maximum lateral extension of the adapter is smaller than or equal to 1.

Furthermore, a method for producing a tower foundation is provided, the method including the steps of: (a) providing a tower adapter having a cylindrical portion extending in a longitudinal direction of the adapter and a first lateral portion extending perpendicularly to the cylindrical portion at a first end thereof, and having a plurality of first through-holes, wherein the ratio of a maximum longitudinal extension and a maximum lateral extension of the adapter is smaller than or equal to 1, (b) providing an anchor and anchor bolts, (c) forming a foundation including the anchor and the anchor bolts, wherein the anchor bolts extend from the anchor to an upper surface of the foundation and protrude from the upper surface, (d) placing the adapter on the anchor bolts so that the anchor bolts extend through and protrude from the first through holes and a space is provided between an upper surface of the foundation and a lower surface of the adapter, (e) pouring grout to form a grout joint in the space provided between the upper surface of the foundation and the lower surface of the adapter, (f) curing the grout joint.

Also, a tower foundation is provided, the tower foundation including an anchor, and tubes for accepting anchor bolts, the tubes being attached to the anchor, wherein the foundation is adapted so that the anchor bolts can be exchangeably fixed to the anchor.

Further aspects, advantages and features of the present invention are apparent from the dependent claims, the description and the accompanying drawings.

According to a first aspect of the invention, a means for connecting a foundation to a tower is provided. The connecting means includes a hollow portion having a closed cross-section, and a flange portion extending perpendicularly to the hollow portion at a first end thereof and having a plurality of first bores, wherein the ratio of the length of the hollow portion and a maximum diameter of the connecting means is smaller than or equal to 1.

According to a further aspect of the present invention, a foundation for a tower is provided. The tower foundation includes an anchoring means, and duct means for accepting coupling means, the duct means being attached to the anchoring means, wherein the foundation is adapted so that the coupling means can be exchangeably fixed to the anchoring means.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
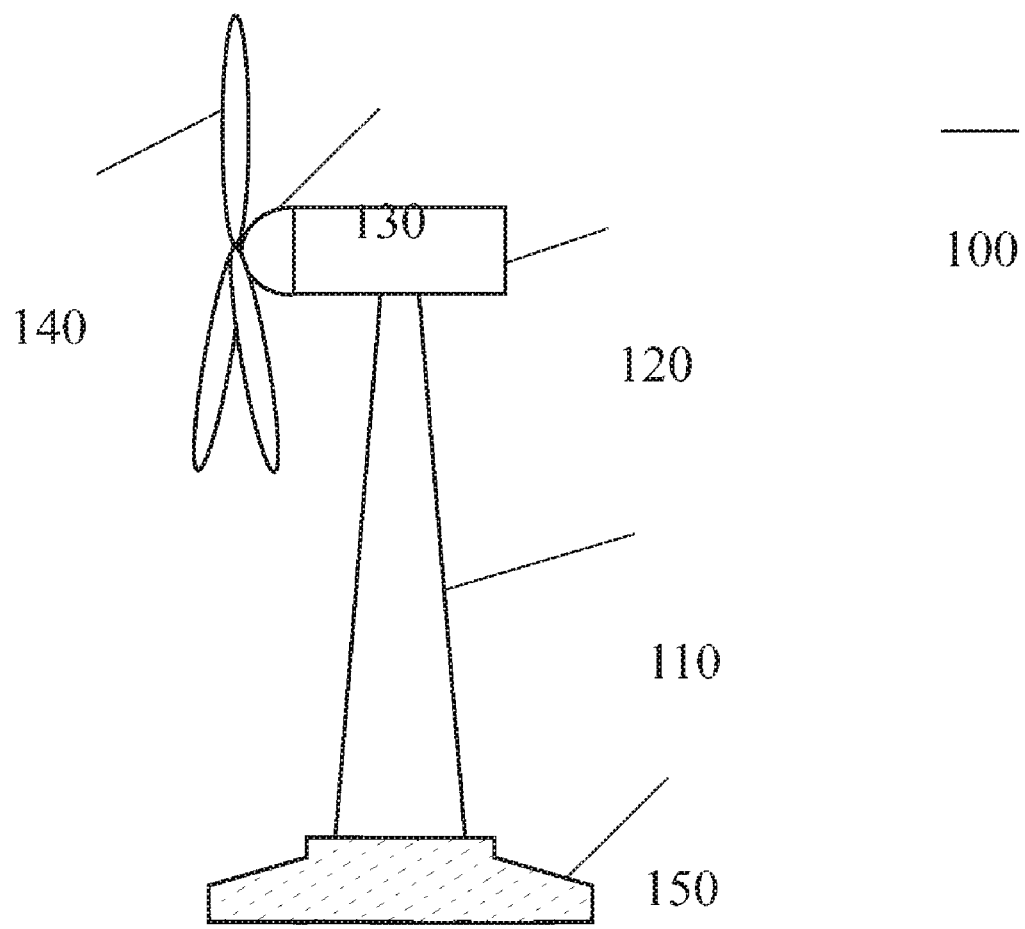
FIG. 1 shows a wind turbine to which the embodiments of the present invention can be applied.

FIG. 1 shows a wind turbine to which the embodiments of the present invention can be advantageously applied. However, it should be understood that the present invention is not limited or restricted to wind turbines but can also be applied to tower structures used in other technical fields. In particular, the various embodiments of the present invention may also be applied to antenna towers used in broadcasting or mobile telecommunication or to pylons used in bridge work. Therefore, although the aspects of the invention will be exemplified with reference to a wind turbine, the scope of the present invention shall not be limited thereto.

The wind turbine 100 shown in FIG. 1 comprises a tower 110 bearing a machine nacelle 120 on its top end. A rotor including a rotor hub 130 and rotor blades 140 is attached to one side of the nacelle 120. The tower 110 is mounted on a foundation 150. Typically, the tower foundation 150 is made of reinforced concrete.

Figure 2:
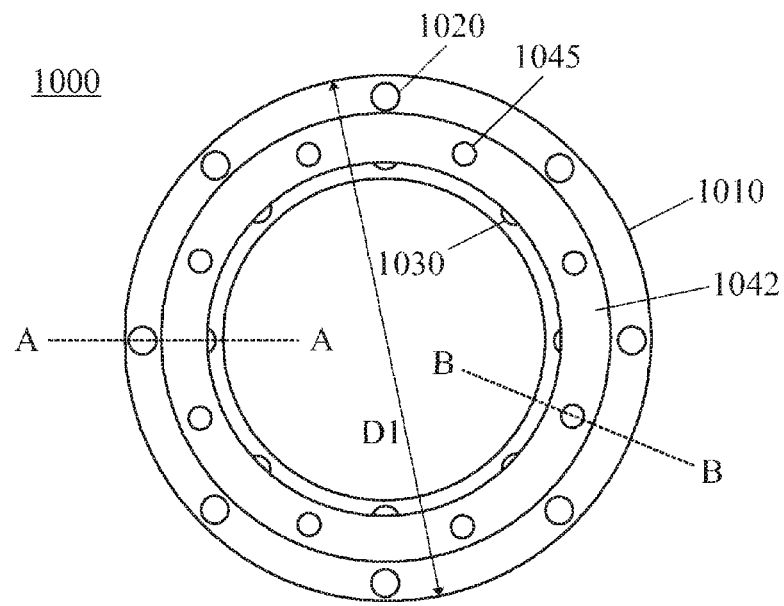
FIG. 2 is a plan top view of an adapter according to an embodiment of the present invention.

FIG. 2 is a plan top view of an adapter 1000 according to an embodiment of the present invention. Such an adapter can be used to form a connection between the lower section of the tower 110 and the foundation 150. In other words, the adapter is a connection means for attaching the lowest tower section to the foundation. The adapter 1000 shown in FIG. 2 has a circular ring-shaped form. However, it should be understood that the adapter 1000 may have any other desired form and that the outer shape of the adapter is adjusted to the cross-section of the tower 110. The adapter 1000 comprises a first lateral portion 1010 having a maximum lateral extension D1. In the present case of the first lateral portion 1010 being circular and ring-shaped, the maximum lateral extension D1 is equal to the outer diameter of the first lateral portion 1010. However, it should be understood that the concept of a maximum lateral extension not confined to circular shape but can be applied also to other cross-sectional shapes of the adapter. For example, for a square or rectangular cross-section the maximum lateral extension is given by the diagonals of the square or rectangle. The first lateral extension includes first through-holes 1020, 1030 which are arranged in a circumferential direction. The first through-holes are grouped into outer through-holes 1020 located adjacent the outer edge of the first lateral portion 1010 and inner through-holes 1030 located adjacent the inner edge of the first lateral portion 1010. The adapter 1000 further comprises a second lateral portion 1042 located above the first lateral portion 1010 and also having a circular ring-shaped form. Second through-holes 1045 are formed within the second lateral portion 1042 in a circumferential direction thereof.

Figure 3:
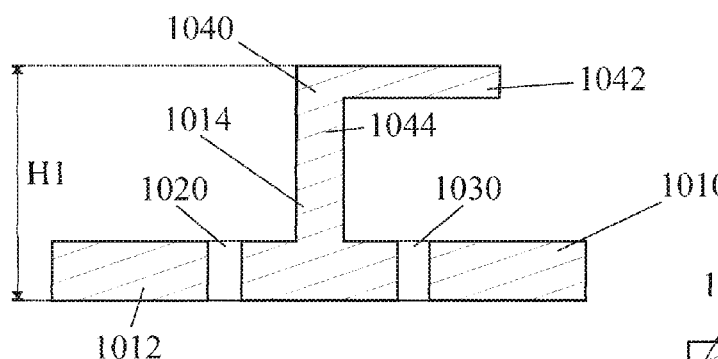
FIG. 3 is a longitudinal cross-sectional view along line A-A in FIG. 2.
Figure 4:
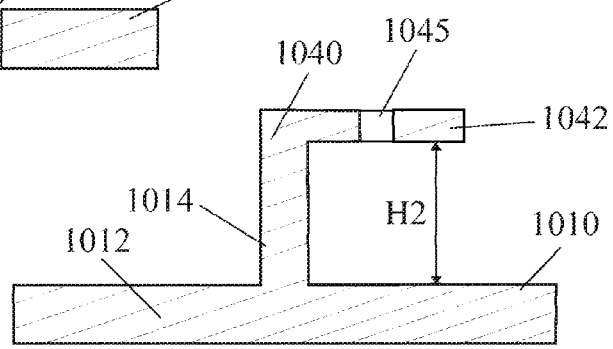
FIG. 4 is a longitudinal cross-sectional view along line B-B in FIG. 2.

For a better understanding of the configuration of adapter 1000, reference is made to FIG. 3 showing a longitudinal cross-sectional view along line A-A in FIG. 2 and to FIG. 4 showing a longitudinal cross-sectional view along line B-B in FIG. 2. The cross-sectional view of FIG. 3 shows that the first lateral portion 1010, 1012 and the second lateral portion 1042 are disposed at opposite ends of a cylindrical portion 1014, 1044. In the present case, the cylindrical portion 1014, 1044 forms a circular cylinder but also other cylinder types are allowed for cylindrical portion 1014, 1044 as long as they are conforming to the cross-sectional shape of tower 110. The cylindrical portion 1014, 1044 is located midway of the first lateral portion, thus dividing the lateral portion into an outer portion 1012 extending to the outside of the cylindrical portion and an inner portion 1010 extending to the inside of the cylindrical portion. Accordingly, the lateral portion 1010, 1012 and the lower part of the cylindrical portion 1014, 1044 form a T-shaped flange. The outer through-holes 1020 are located within the outer portion 1012 and the inner through-holes 1030 are located within the inner portion 1010. The second lateral portion 1042 is located at the opposite end 1044 of the cylindrical portion. In the present embodiment, the second lateral portion 1042 extends only inwardly of the cylindrical portion so that the second lateral portion 1042 and the upper end 1044 of the cylindrical portion form an L-shaped flange 1040. Thus, the vertical cross-sectional shape of the adapter 1000 according to the present embodiment can be described as a T-shaped flange 1010, 1012, 1014 being connected to an L-shaped flange 1042, 1044. However, it should be understood that the second lateral portion may also have an outwardly extending portion so that also the second lateral portion is formed as a T-flange.

The adapter 1000 has a maximum longitudinal extension H1, which may also be called the height of the adapter. According to an embodiment of the present invention, the ratio of the maximum longitudinal extension H1 and the maximum lateral extension D1 is smaller or equal to 1, more specifically in the range of 0.1 to 0.5, even more specifically in the range of 0.15 to 0.3. In other words, the adapter 1000 is at least as wide as it is high and, typically, is wider than it is high. For example, the diameter D1 is in the range of 3000 mm to 5000 mm for wind turbine towers and the height of the adapter is about 1000 mm resulting in an aspect ratio, i.e. height-to-diameter ratio, of 0.2 to 0.33. Typically, the height of the adapter is smaller or equal to 2 m, more specifically 800 mm to 1500 mm, even more specifically, 800 mm to 1200 mm. Furthermore, the weight of the adapter is typically smaller than or equal to 10,000 kg, more specifically 5,000 kg, even more specifically, 2500 kg. Therefore, the adapter 1000 is relatively small and can be handled even by a single small mobile crane. Especially, the adapter may be transported in an upright position on a truck since it does not exceed the maximum headroom of bridges. Since the adapter can be handled by a single small crane, the costs are considerably reduced compared to conventional construction necessitating two larger cranes.

The longitudinal cross-sectional view shown in FIG. 4 shows that the second through holes 1045 are formed in the second lateral portion 1042 of the L-shaped flange 1040. A spacing H2 is provided between the upper surface of the inner portion 1010 of the first lateral portion and the lower surface of the inner portion of the second lateral portion 1042. This spacing is dimensioned to provide sufficient workspace for workers establishing bolt connections through the first and second through-holes 1030, 1045, respectively.

Figure 5:
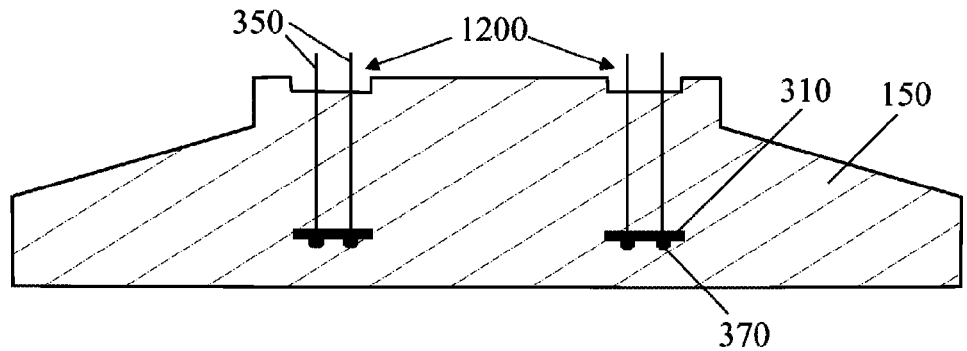
FIGS. 5 to 8 show different steps of a method for producing a tower foundation according to an embodiment of the present invention.
Figure 6:
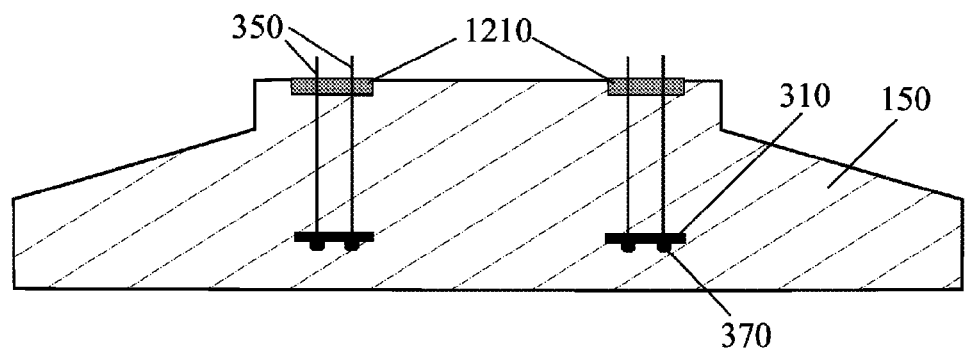
Figure 7:
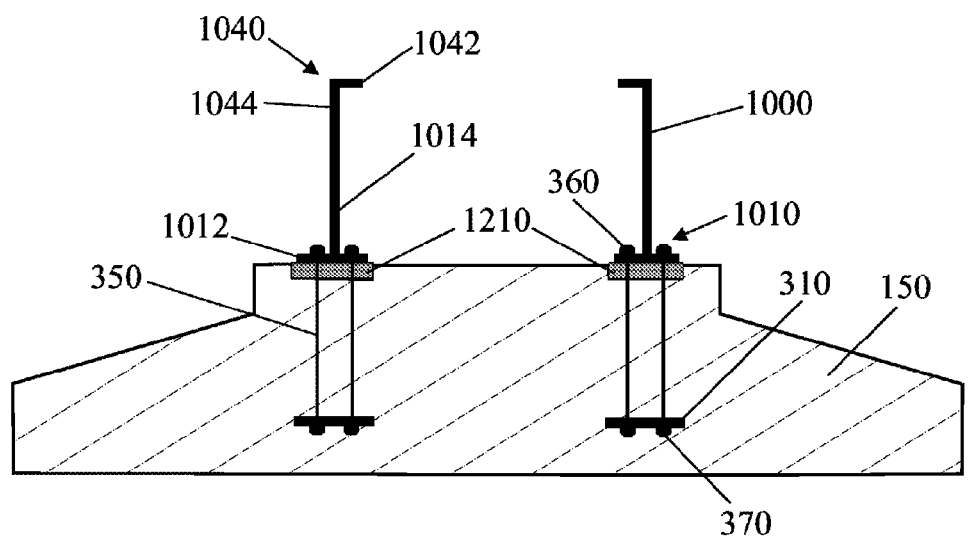

The use of the adapter 1000 will now be explained with reference to FIGS. 5 to 8 showing different steps of a method for producing a tower foundation according to an embodiment of the present invention. FIG. 5 shows a cross-sectional view of a tower foundation 150 made of reinforced concrete. Foundation 150 is made according to well-established methods for reinforced concrete construction. An anchor ring 310 is embedded in foundation 150. Anchor bolts 350 are fixed to anchor 310 by nuts 370. Typically, the anchor bolts 350 are fixed to anchor ring 310 and are placed together with the reinforcement within the formwork of the foundation. Then, concrete is poured into the formwork and the foundation 150 is formed. Furthermore, a ring-shaped recess 1200 is formed within an upper surface of the foundation 150. The anchor bolts 350 have a sufficient length so that they extend from the anchor ring 310 to the upper surface of the foundation and protrude therefrom. Particularly, the recess 1200 is formed such that the anchor bolts extend from a bottom surface of the recess, i.e. the recess 1200 is located above and aligned with the anchor ring 310. Next as shown in FIG. 6, grout is poured into the recess 1200 to form a grout joint 1210. The length of the anchor bolts 350 is such that they also protrude from an upper surface of the grout joint 1210. In a next step, the adapter 1000 is aligned with the foundation 150 such that the first lateral portion 1010, 1012 faces the upper surface of the foundation and that the second lateral portion 1042 is disposed at a distal end of the adapter. Then, the first through-holes 1020, 1030 of the adapter 1000 are aligned with the anchor bolts 350 protruding from the grout joint 1210. However, the grout joint may also be formed by a formwork technique in that a shuttering is built on the upper surface of the foundation 150 and the grout is poured into the shuttering. Also in this case, the anchor bolts 350 are sufficiently long to protrude from an upper surface of the grout joint.

Figure 8:
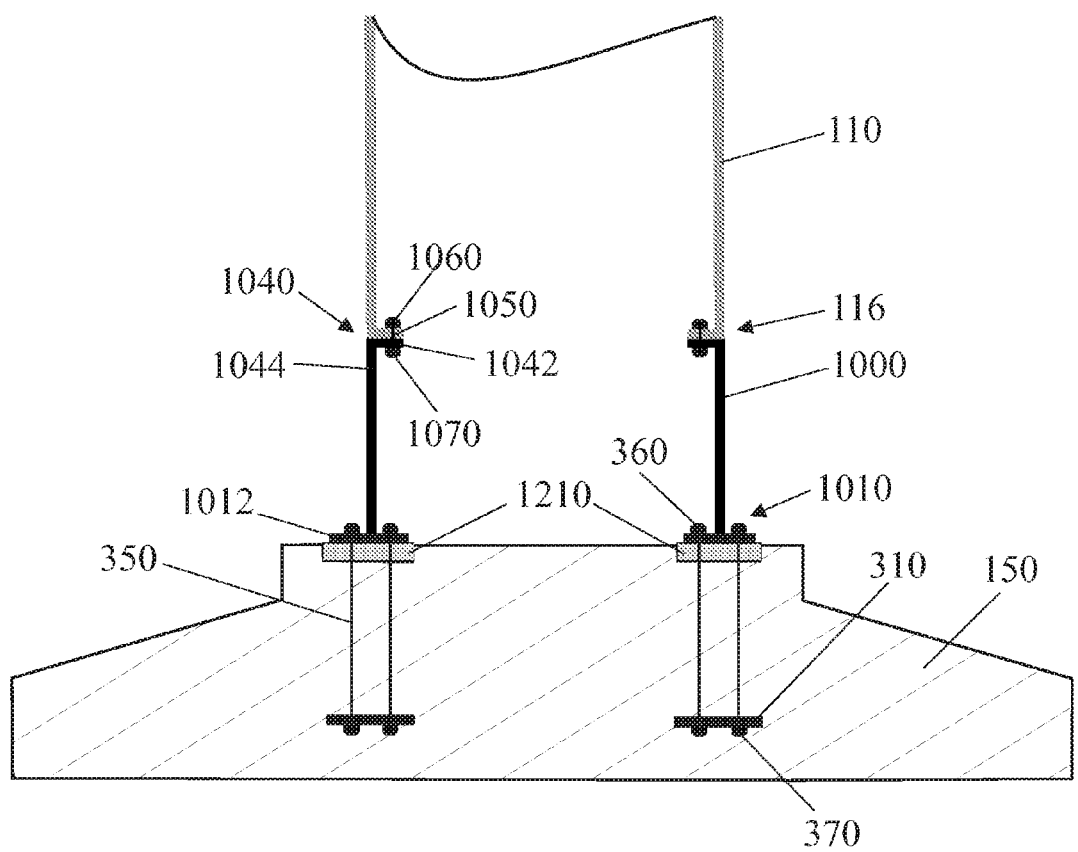

Next, the adapter 1000 is placed on the grout joint 1210 so that the anchor bolts 350 extend through the first through-holes 1020, 1030 formed in the first lateral portion 1010, 1012. The length of the anchor bolts 350 is sufficient so that the anchor bolts 350 still protrude from an upper surface of the first lateral portion 1010, 1012. Typically, placing the adapter 1000 on the foundation is done by means of a mobile crane. The adapter 1000 is lifted by the crane and moved over the upper surface of the foundation 150. After the first through-holes 1020, 1030 of the adapter are aligned with the anchor bolts 350, the crane lowers the adapter until the adapter is placed on the grout joint 1210. After placing the adapter on the grout joint, the adapter 1000 is fixed to the grout joint 1210 by fastening nuts 360 to the protruding upper ends of the anchor bolts 350. In this step, a desired prestress can be applied to the bolt connection 310, 350, 360, 370. Finally, the grout of the grout joint 1210 cures while the adapter 1000 is assembled to the anchor assembly. After the curing of the grout joint 1210, a lower tower section can be mounted to adapter 1000 as shown in FIG. 8. The lower tower section 110 has a flange portion 116 adapted to fit with the second lateral portion 1042 of the adapter 1000. Furthermore, the flange portion 116 of the tower section 110 also has through-holes which are aligned with the second through-holes 1045 formed in the second lateral portion 1042. A bolt connection is established between adapter 1000 and tower 110 by inserting bolts 1050 into the through-holes formed within the flange portion 116 and the second lateral portion 1042. The bolts 1050 are fastened by upper and lower nuts 1060, 1070, respectively. Thus, a firm connection between the adapter 1000 and the tower 110 is established.

Figure 9:
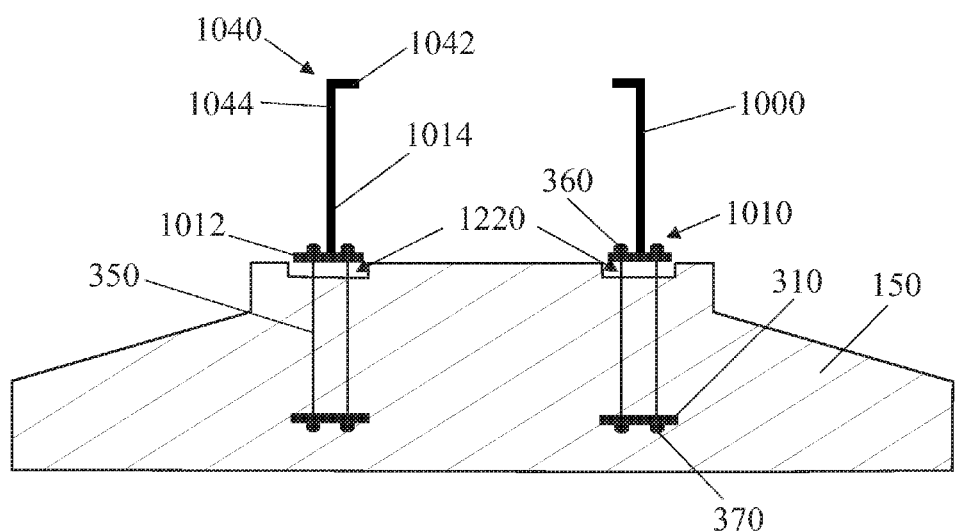
FIGS. 9 and 10 show different steps of a method for producing a tower foundation according to an alternative embodiment of the present invention.
Figure 10:
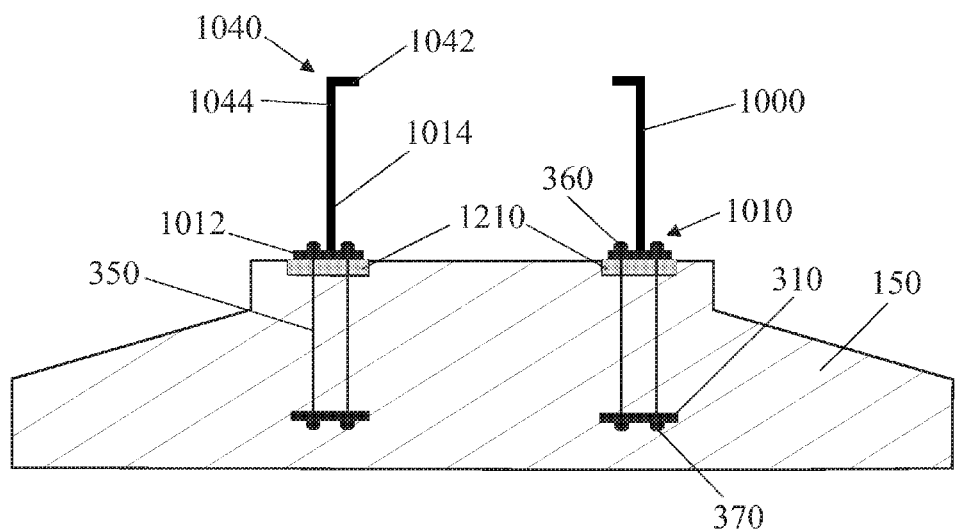

An alternative method according to an embodiment of the present invention for producing the tower foundation including the adapter is now described with reference to FIGS. 9 and 10. Therein, it is shown that the foundation 150 is produced so that a space 1220 is provided between an upper surface of the foundation and a lower surface of the adapter. In the example shown in FIG. 9, the spacing is formed as a recess so that the bottom of the recess forms the part of the upper surface of the foundation 150 to which the adapter 1000 is spaced. The adapter 1000 may be held in the spaced condition by filler plates (not shown) on which it is placed. Further to holding adapter 1000 in a spaced condition, the filler plates are also used to level adapter 1000. IN a second step, grout is poured into the space 1220 to form a grout joint 1210 between the concrete foundation 150 and the adapter 1000. The embodiment shown in FIGS. 9 and 10 includes a grout joint 1210 being formed in a recess of the foundation. However, according to another embodiment of the present invention the grout joint is formed on the entire upper surface of the foundation 150. For this purpose, a formwork has to be built on the upper surface of the foundation 150. Then, grout is poured to form a grout joint between the upper surface of the foundation and the adapter. According to an even further embodiment of the present invention, the adapter 1000 and the anchor 310 may be assembled prior to forming the foundation. In this case, the preassembled anchor/adapter assembly can even be put into the excavation pit together with the reinforcement prior to pouring the concrete. The anchor/adapter assembly should then be protected against displacement during concrete pouring. The foundation will thus be formed with a preassembled anchor/adapter assembly. However, also in this case a spacing must be provided in which the grout joint can be formed after producing the concrete foundation. After the foundation including the adapter is formed, a bottom section of the tower can be mounted to the adapter in a similar manner as described install the tower and with reference to FIG. 8.

Due to its configuration, especially due to its aspect ratio, the above-described adapter according to an aspect of the present invention can be handled by a single small mobile crane. Therefore, the foundation including the adapter can be produced without need of a two huge mobile cranes. Since small mobile cranes are less expensive than huge mobile cranes and can also be relocated more easily, the adapter according to an aspect of the present invention allows saving of financial and time resources during the construction of a tower. In particular, the expensive two huge mobile cranes are only required after producing the foundation for mounting of the tower sections. Thus, idle time of these expensive cranes is avoided. Furthermore, sample cubes of the grout are produced at the construction site and tested in a nearby laboratory. These sample grout cubes have to be again tested before putting the wind turbine to operation. Only if the sample cubes pass the test, the wind turbine can be put to operation. However, it might take several days or even weeks before the sample cubes have sufficiently cured and pass this final test. Since the above-described adapter allows to produce the foundation including the adapter well ahead of the tower construction, sufficient time can be awaited before the tower construction crew starts with the tower construction. Thus, it is possible that the crew may put the wind turbine to operation directly after installing the tower.

Figure 11:
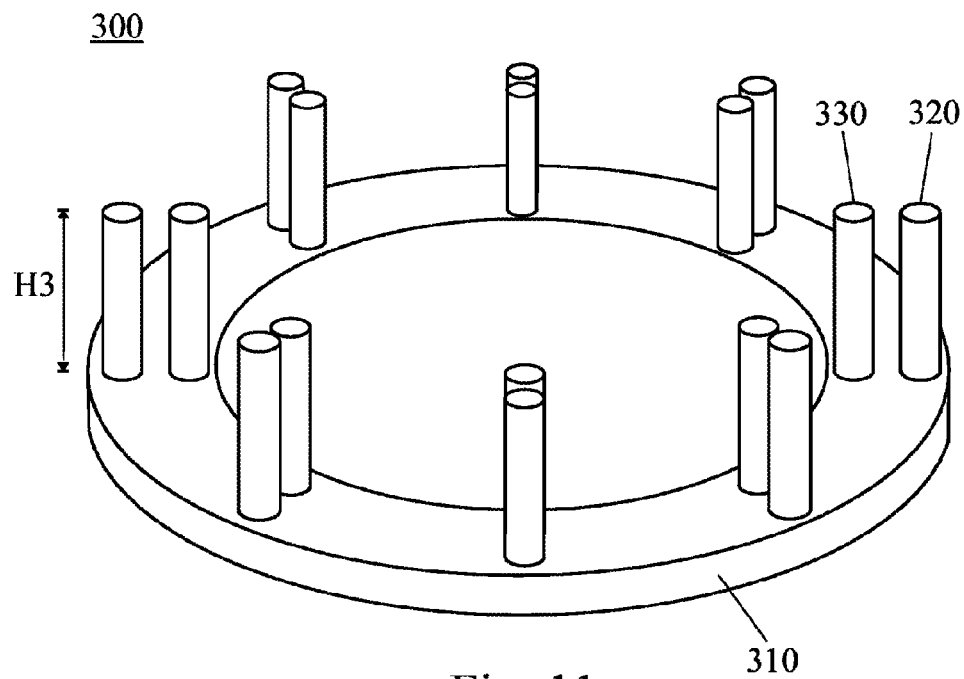
FIG. 11 is a perspective view of an anchor cage according to an embodiment of the present invention.
Figure 12:
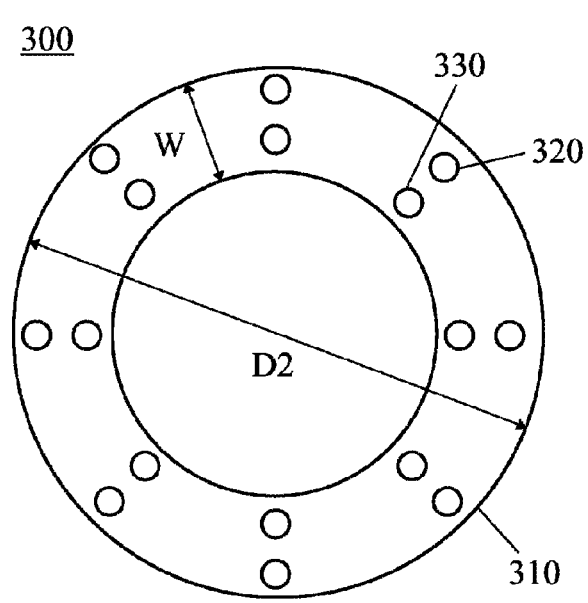
FIG. 12 is a plan top view of the anchor cage shown in FIG. 9.

Another aspect of the present invention is now described with reference to FIG. 11 showing a perspective view of an anchor cage 300 according to an embodiment of the present invention. The anchor cage 300 includes an anchor ring 310 to which hollow tubes 320, 330 are fixed. The anchor cage 300 may be prefabricated or assembled at the construction site by welding the tubes 320, 330 to anchor ring 310. The tubes are arranged in a circumferential direction of the anchor ring 310 and are grouped into outer tubes 320 and inner tubes 330. Each tube is configured to receive an anchor bolt 350. Furthermore, each tube has a length H3 which is adjusted so that the tubes 320, 330 will extend from the anchor ring 310 up to an upper surface 155 of a foundation 150 in which the anchor cage 300 will be embedded. The plan top view of the anchor cage shown in FIG. 12 reveals that the anchor ring 310 has an outer diameter D1 and a width W which both are adapted to either an adapter 1000 or a lower tower section 110. It should be understood that, similar to the case of the adapter 1000, the circular ring shape of anchor ring 310 is merely an example. In particular, anchor 310 may have any desired shape, especially it may have a square, rectangular or ellipsoidal shape. Furthermore, anchor 310 is not necessarily ring-shaped but may also be solid. Although anchor 310 is shown as an integrally formed piece in FIG. 11, it should be understood that anchor 310 may also have two, three, four, or even more parts which are assembled at the construction site. For example, anchor 310 may be ring-shaped and consist of two half-circles or four quarter-circles.

Figure 13:
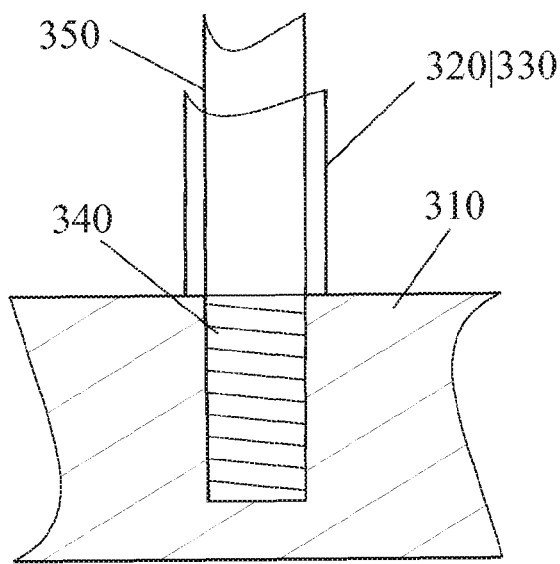
FIG. 13 is a cross-sectional view of an embodiment of the anchor cage.

FIG. 13 shows a cross-sectional view of an embodiment of the anchor 310. Therein, the anchor 310 includes a blind hole 340 which is provided with a female thread. The threaded lower end of an anchor bolt 350 is screwedly fixed to anchor 310. Furthermore, a tube 320/330 is attached to anchor 310 and encircles the blind hole 340. The tube 320/330 is configured to receive the anchor bolt 350. Furthermore, the anchor bolt 350 is guided by the tube 320/330.

Figure 14:
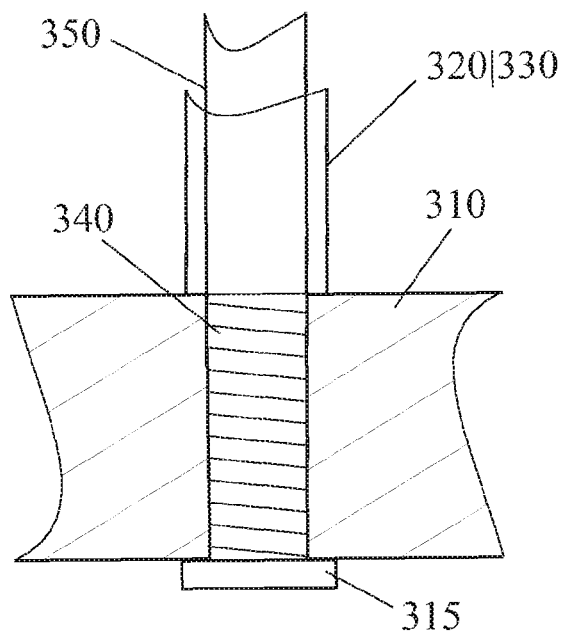
FIG. 14 is a cross-sectional view of another embodiment of the anchor cage.

FIG. 14 shows an alternative embodiment of the anchor 310. Therein, the anchor 310 includes a through-hole 340 which is provided with a female thread. The threaded lower end of an anchor bolt 350 is screwedly fixed to anchor 310. The lower end of the threaded through-hole 340 is sealed with a closing plate 315. Closing plate 315 may be fixed to anchor 310 at the construction site or may be preassembled. Furthermore, a tube 320/330 is attached to anchor 310 and encircles the through-hole 340. The tube 320/330 is configured to receive the anchor bolt 350. Furthermore, the anchor bolt 350 is guided by the tube 320/330.

Figure 15:
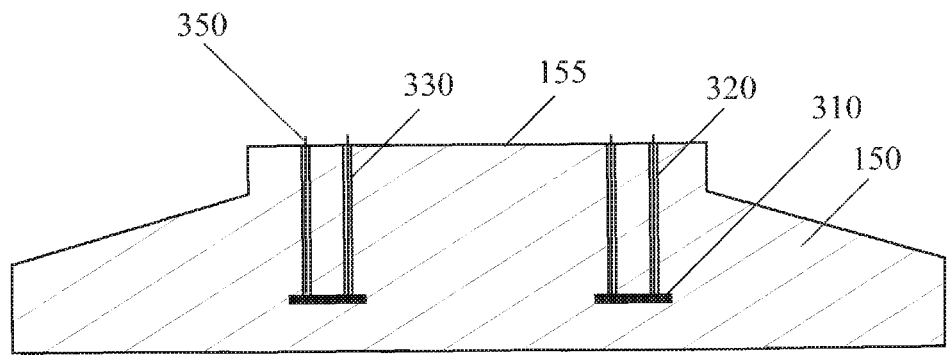
FIGS. 15 and 16 show different steps of a method for producing a tower foundation according to an embodiment of the present invention.
Figure 16:
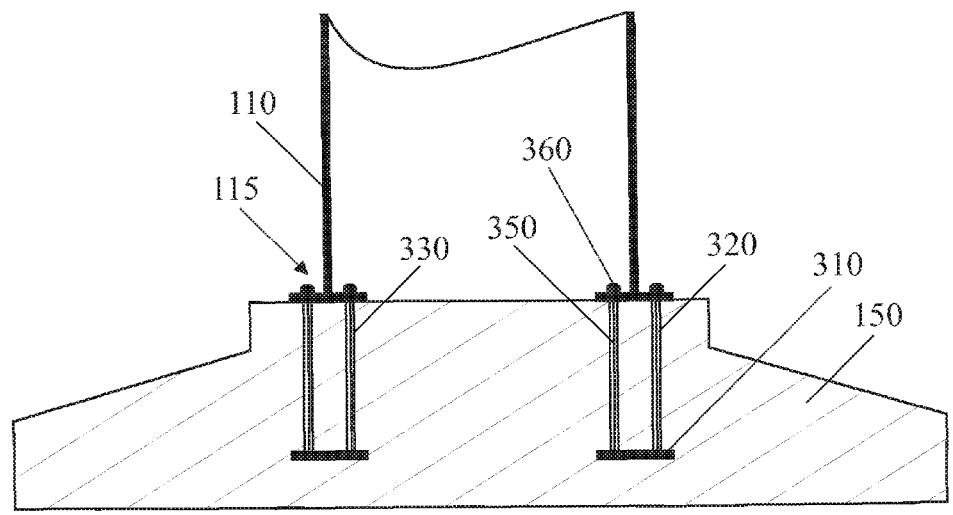

Next, the use of anchor cage 300 in a method for producing a tower foundation according to an embodiment of the present invention is described with reference to FIGS. 15 and 16. FIG. 15 shows a cross-sectional view of a first embodiment wherein a foundation 150 embedding an anchor cage 300 as described above has been produced. In particular, the anchor cage with the anchor bolts mounted thereto is put into the form work for the foundation together with the reinforcement. The anchor cage 300 is fixed so that it is not displaced during concrete pouring. Then, concrete is poured to form the foundation 150. Since the tubes 320, 330 extend from anchor 310 up to an upper surface 155 of the foundation, they preserve channels so that anchor bolts 350 are not in contact with the concrete. The anchor bolts 350 have a length so that they protrude from the upper surface 155 when being screwedly fixed to anchor 310. Typically, the anchor bolts 350 are centered within the tubes 320, 330 by means of a tapered ring (not shown). Due to the centering, the anchor bolts 350 will have no contact to a flange of a tower section or an adapter mounted thereto. For example, a bottom section 110 of a tower has a T-flange 115 with through-holes formed therein. The through-holes are aligned with the anchor bolts 350 protruding from the upper surface 155. Due to the centering of the anchor bolts 350, the anchor bolts have no direct contact with the flange. Then, the bottom section 110 is placed on the foundation 150 so that the anchor bolts 350 extend through the through-holes of the T-flange 115. Finally, the bottom section 110 is secured by nuts 360.

Since an anchor bolt 350 is not embedded in the concrete but is guided within a hollow tube 320/330, it may be exchanged by loosening nut 360 and unscrewing the bolt from the anchor 310. Thus, an exchangeable bolt connection for a tower foundation is established. Whenever an anchor bolt 350 is damaged or broken, it can be readily replaced by just unscrewing it. Furthermore, also inspection of the bolts is facilitated since they may be taken out or an inspection device may be lowered into the hollow tube. Furthermore, anchor bolts 350 may be provided with a plastic shim inside the tubes.

Figure 17:
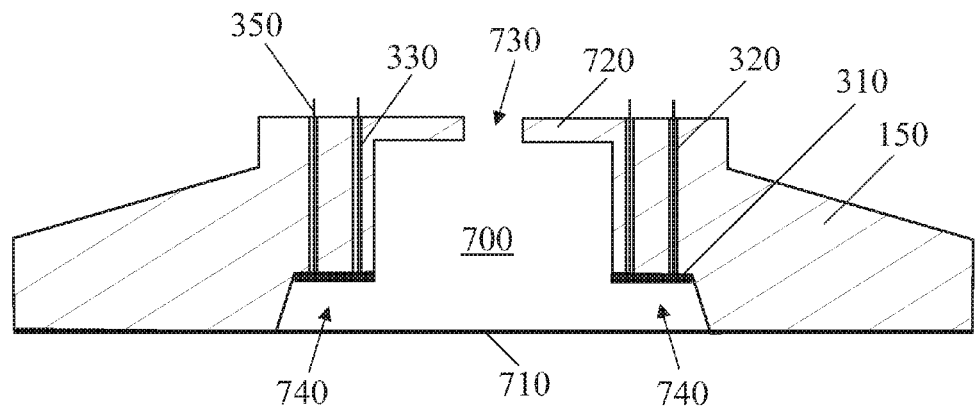
FIG. 17 is a cross-sectional view of a tower foundation according to another embodiment of the present invention.
Figure 18:
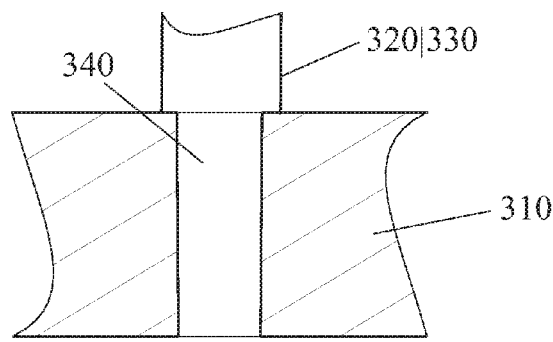
FIG. 18 is a cross-sectional view of an embodiment of the anchor cage used in the embodiment shown in FIG. 14.

Another embodiment of a tower foundation according to another embodiment of the present invention is shown in FIG. 17. Therein, a foundation 150 is formed with a basement 700. The basement 700 includes a subgrade or bottom plate 710 and a basement ceiling 720. The basement ceiling 720 includes a basement entrance 730, e.g. a manhole, which provides access to the basement 700. Furthermore, an anchor 310 and hollow tubes 320, 330 are embedded in the foundation 150 in a similar fashion as in the above-described embodiment. However, the configuration of the anchor 310 is different in this embodiment as can be seen from FIG. 18 showing a cross-sectional view the anchor cage used in the present embodiment. Therein, it can be seen that the anchor 310 has a through-hole 340 instead of a blind hole. Accordingly, an anchor bolt 350 may extend through anchor 310 into a space 740 provided below anchor 310. In particular, the basement is formed such that it provides access to the through-holes formed in anchor 310 in that it provides a workspace 740. Workspace 740 is dimensioned sufficiently large so that a worker can work on anchor 310 and may establish a bolt connection or fasten nuts on a bolt extending through anchor bore 340. Therefore, the anchor bolts 350, which are typically installed prior to the formation of the foundation, have to be fixed in their position. This is typically done by using a molding tool.

Figure 19:
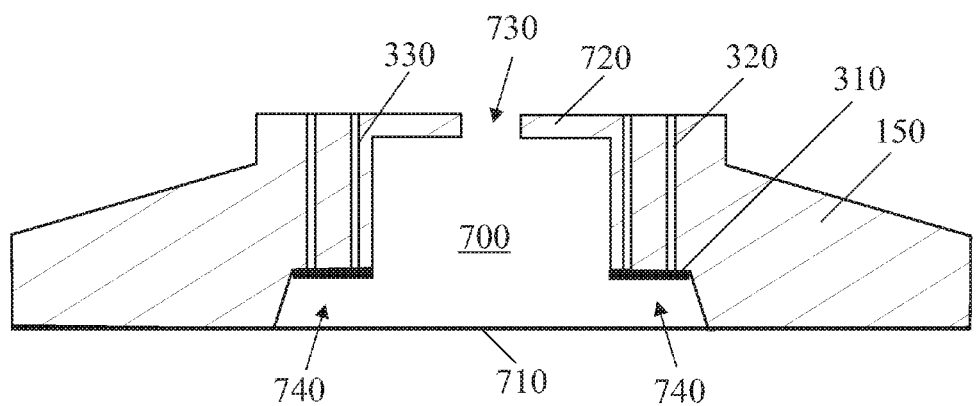
FIGS. 19 to 21 show different steps of a method for producing a tower foundation according to another embodiment of the present invention.
Figure 20:
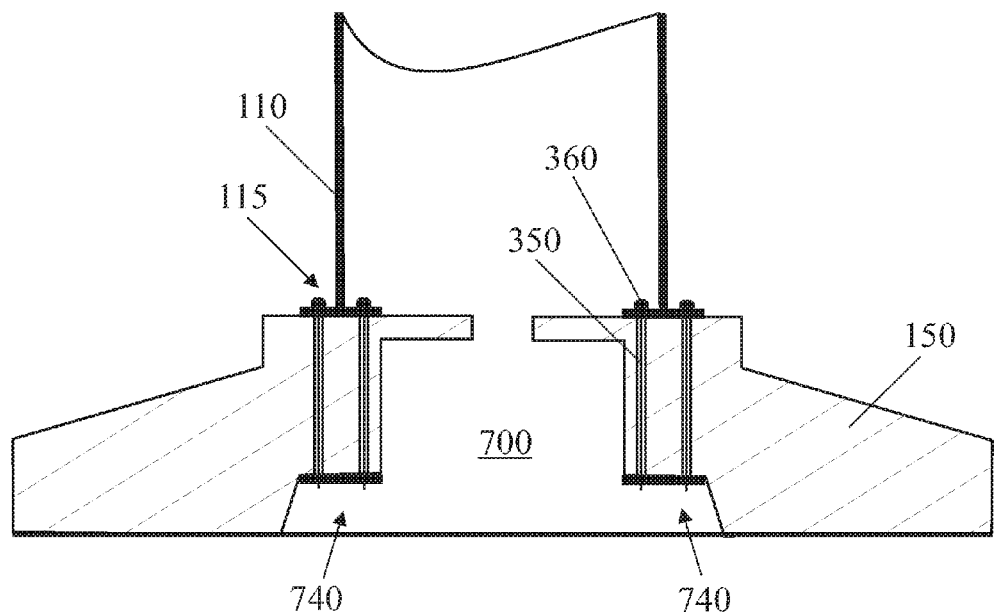
Figure 21:
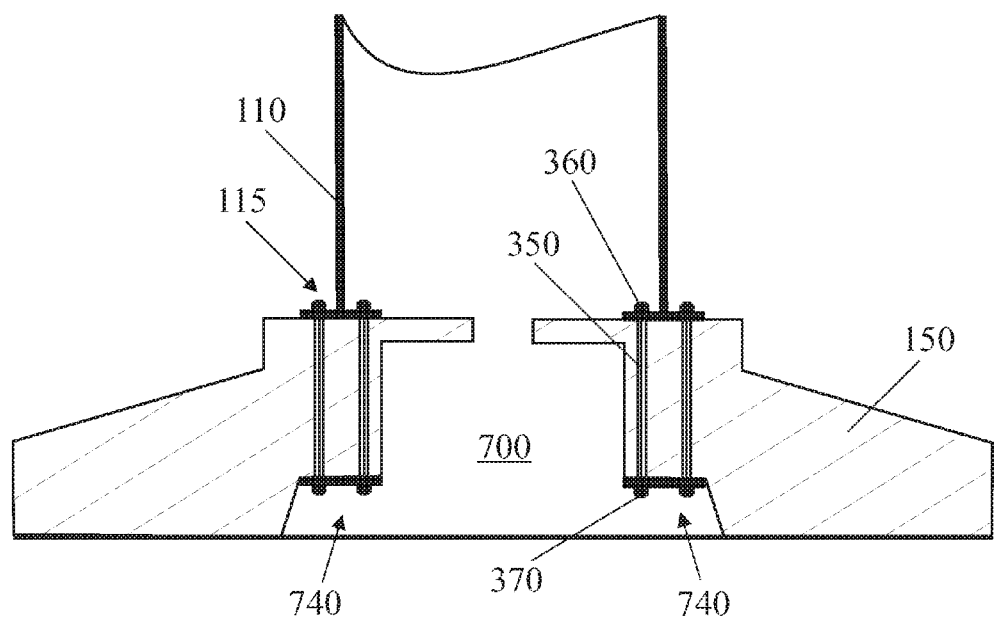

Next, a method for producing a tower foundation as described above is explained with reference to FIGS. 19 to 21. First, a tower foundation as shown in FIG. 17 is produced by known reinforced concrete construction. In particular, anchor 310 and tubes 320, 330 are positioned within the form work together with the reinforcement and, then, concrete is poured into the form work. After that, a bottom section 110 of a tower is placed on the upper surface of the foundation. Anchor bolts 350 are inserted into through-holes formed in a T-flange portion 115 of the tower section 110 and into the tubes 320, 330. The anchor bolts 350 are secured with upper nuts 360 and lower nuts 370 to establish a bolt connection. For securing the lower nuts 370, access to the protruding anchor bolts 350 is provided from the basement 700 by workspace 740.

Since an anchor bolt 350 is not embedded in the concrete but is guided within a hollow tube 320/330, it may be exchanged by loosening upper and lower nuts 360, 370. Thus, an exchangeable bolt connection for a tower foundation is established. Whenever an anchor bolt 350 is damaged or broken, it can be readily replaced by just loosening the upper and lower nuts 360, 370. Especially, even broken bolts can be readily replaced since one part of the bolt may be taken out from above and one part may be taken out from the workspace 740. Furthermore, also inspection of the bolts is facilitated since they may be taken out or an inspection device may be lowered into the hollow tube. Furthermore, anchor bolts 350 may be provided with a plastic shim inside the tubes.

Figure 22:
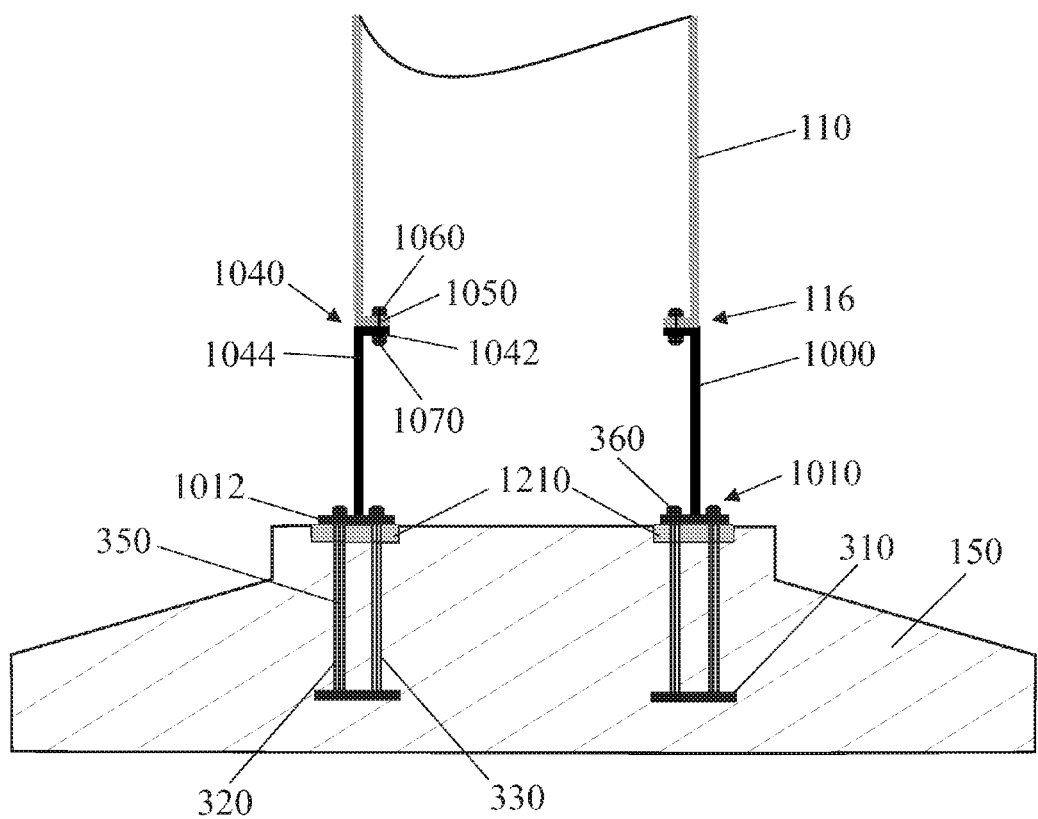
FIG. 22 is a cross-sectional view of a tower foundation according to a further embodiment of the present invention.
Figure 23:
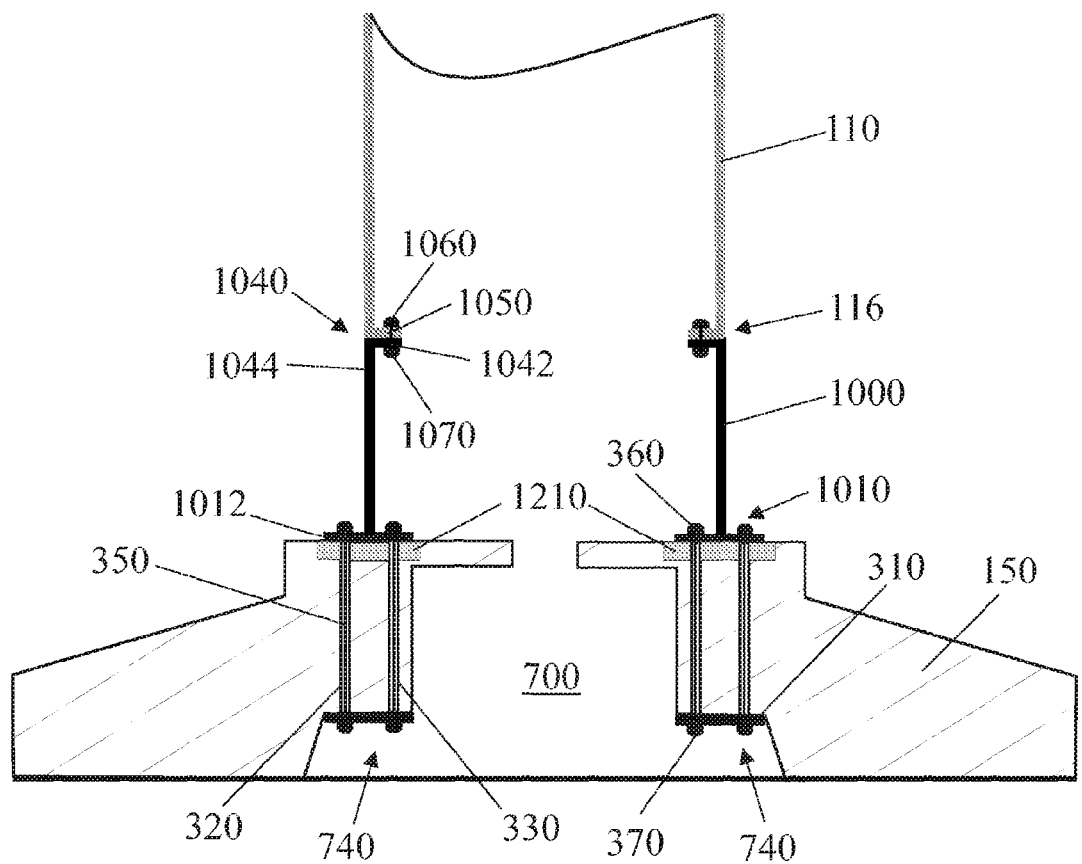
FIG. 23 is a cross-sectional view of a tower foundation according to an even further embodiment of the present invention.

Furthermore, the various above described aspects and embodiments of the present invention may be combined with another. FIG. 22 is a cross-sectional view of a tower foundation according to a further embodiment of the present invention. This embodiment combines the exchangeable bolt connection of the embodiment shown in FIG. 16 with the adapter 1000 of the embodiment shown in FIG. 2. FIG. 23 is a cross-sectional view of a tower foundation according to an even further embodiment of the present invention. This embodiment combines the exchangeable bolt connection of the embodiment shown in FIG. 21 with the adapter 1000 of the embodiment shown in FIG. 2. By combining the exchangeable bolt connection with the adapter, an even further improvement is achieved.

While the invention has been described in terms of various specific embodiments, those skilled in the art will recognize that the invention can be practiced with modification within the spirit and scope of the claims.

What is claimed is:

1. A tower adapter, comprising
   a cylindrical portion extending in a longitudinal direction of the tower adapter; and
   a first lateral portion extending perpendicularly to the cylindrical portion at a first end thereof, the first lateral portion having an outer portion extending to an outside of the cylindrical portion and an inner portion extending to an inside of the cylindrical portion, the outer portion defining at least one outer through-hole and the inner portion defining at least one inner through-hole; and
   a second lateral portion at a second end of the cylindrical portion opposite to the first end configured to couple to a tower portion with a fastener, such that the tower portion is positioned substantially on top of the second lateral portion, the second lateral portion extending perpendicularly to the cylindrical portion and having at least one inner through-hole configured to receive the fastener, the cylindrical portion and the second lateral portion forming an L-shaped flange, the second lateral portion extending inwardly from the cylindrical portion;
   wherein a ratio of a maximum longitudinal extension and a maximum lateral extension of the adapter is smaller than or equal to 1.

2. The tower adapter according to claim 1, wherein the maximum longitudinal extension of the adapter is smaller than or equal to 2 m.

3. The tower adapter according to claim 1, wherein the weight of the tower adapter is smaller than or equal to 10,000 kg.

4. The adapter according to claim 1, wherein a spacing between the inner portion of the first lateral portion and inner portion of the second lateral portion is adapted to provide sufficient workspace for establishing bolt connections.

5. The adapter according to claim 1, wherein the cylindrical portion is a circular cylinder.

6. A tower foundation, comprising an anchor;
   tubes for accepting anchor bolts, the tubes attached to the anchor; and
   a tower adapter having a cylindrical portion extending in a longitudinal direction of the adapter, a first lateral portion extending perpendicularly to the cylindrical portion at a first end thereof, and a second lateral portion extending perpendicularly inward from the cylindrical portion at a second end thereof configured to couple to a tower portion with a fastener, such that the tower portion is positioned substantially on top of the second lateral portion and includes at least one inner through-hole configured to receive a tower fastener, wherein the first lateral portion has an outer portion extending to an outside of the cylindrical portion and an inner portion extending to an inside of the cylindrical portion, and the outer portion defines at least one outer through-hole and the inner portion defines at least one inner through-hole;
   wherein the anchor bolts are exchangeably fixed to the anchor;
   wherein a ratio of a maximum longitudinal extension and a maximum lateral extension of the adapter is smaller than or equal to 1.

7. The tower foundation according to claim 6, wherein the anchor comprises threaded blind holes adapted for accepting threaded anchor bolts.

8. The tower foundation according to claim 6, wherein the anchor comprises through-holes adapted for inserting anchor bolts, and wherein the foundation comprises a basement providing an access to the through-holes of the anchor.

* * * * *